US011243626B2

(12) United States Patent
Chuang et al.

(10) Patent No.: US 11,243,626 B2
(45) Date of Patent: Feb. 8, 2022

(54) INTEGRATED DISPLAY SYSTEM CIRCUITRY AND A METHOD FOR DRIVING THEREOF

(71) Applicant: Solomon Systech (Shenzhen) Limited, Guangdong (CN)

(72) Inventors: Chen Jung Chuang, New Taipei (TW); Hyong Cheol Shin, Seoul (KR); Chih Chiang Tsai, New Taipei (TW); Yu Wei Liang, New Taipei (TW)

(73) Assignee: Solomon Systech (Shenzhen) Limited, Shenzhen (CN)

( * ) Notice: Subject to any disclaimer, the term of this patent is extended or adjusted under 35 U.S.C. 154(b) by 0 days.

(21) Appl. No.: 16/908,805

(22) Filed: Jun. 23, 2020

(65) Prior Publication Data

US 2021/0397280 A1 Dec. 23, 2021

(51) Int. Cl.
*G06F 3/041* (2006.01)
*G09G 3/20* (2006.01)

(52) U.S. Cl.
CPC ........ *G06F 3/0412* (2013.01); *G06F 3/04166* (2019.05); *G09G 3/20* (2013.01); *G09G 2300/0408* (2013.01); *G09G 2310/0283* (2013.01); *G09G 2310/0297* (2013.01); *G09G 2330/023* (2013.01)

(58) Field of Classification Search
CPC ..... G06F 3/0412; G06F 3/04166; G09G 3/20; G09G 2300/0408; G09G 2310/0283; G09G 2310/0297; G09G 2310/023
See application file for complete search history.

(56) References Cited

U.S. PATENT DOCUMENTS

2015/0269897 A1* 9/2015 Kitsomboonloha ........................ G09G 3/3648
345/205
2020/0273418 A1* 8/2020 Zhang ................ G09G 3/3677

* cited by examiner

*Primary Examiner* — Peter D McLoone

(57) ABSTRACT

A display system circuitry capable of saving power consumption includes a display panel and a driver circuitry. In particular, the display panel includes a plurality of source electrodes with a plurality of data lines and a plurality of gate electrodes further includes a gate driver which is directly incorporated into a thin film transistor array to form Gate on Array (GOA) electrode, a source electrode transmitting a plurality of data driving signals, a gate electrode transmitting gate driving signals, a VCOM electrode transmitting voltage driving signals, a display electrode transmitting displaying driving signals. The driver circuitry includes a display driver IC which includes a source driver operably configured to drive the source electrode and gate control to control gate driver output, and a touch driver IC configured to generate the touch scan signal from a touch sensor.

17 Claims, 15 Drawing Sheets

INTEGRATED DISPLAY SYSTEM CIRCUITRY AND A METHOD FOR DRIVING THEREOF

FIELD OF THE INVENTION

Embodiments of the present invention relate to a display device and more particularly, to an integrated display system circuitry capable of saving power consumption and a method for driving thereof.

BACKGROUND OF THE INVENTION

A touch screen is an input device included in image display devices such as Liquid Crystal Displays (LCDs), Field Emission Displays (FEDs), Plasma Display Panel (PDPs), Electroluminescent Displays (ELDs), and Electrophoretic Display (EPDs), and allows a user to input information by applying pressure (i.e., pressing or touching) to a touch sensor of a touch screen. The demand for display devices with integrated touch screens such as smartphones and tablet Personal Computers (PCs) is increasing.

A touch sensor used for a display device is often implemented by In-Cell method which embeds the touch sensor inside the display panel. A display device employing the in-cell touch method shares a touch electrode of the touch sensor and a common electrode of the display panel and uses a display time and a touch sensing time interchangeably according to a time-division scheme. Since the display panel and the touch sensor are driven by a time-division scheme, operating time is not sufficiently secured. Moreover, as the operating time for the touch sensor is shortened, it is likely that touch sensitivity is degraded accordingly. In order to drive a touch sensor in a reliable manner, it is important to reduce the display time; however, if the display time is reduced, video display quality is degraded in return.

A classic LCD display is a single-gate display having vertical lines as the source electrodes driven by a source driver IC and horizontal lines as the gate electrodes. The gate drivers can be within the display panel. These gate drivers are made from Thin-Film Transistors (TFT). The gate drivers can also be external driver IC. The single-gate display also VCOM electrodes and display electrodes sandwiching the liquid crystal (LC) and effectively forming a capacitor at each pixel.

With increase of resolution of a display panel and performance the cost of a drive integrated circuit (IC) also increases. Thus, in order to reduce cost of the drive integrated circuit (IC) while increasing binding yield of the drive integrated circuit (IC), a design scheme of dual-gate drive is commonly used in a display panel. A dual gate display structure includes two adjacent odd and even pixels respectively driven by the same source during the time of a horizontal line, so that the number of sources electrodes can be reduced by half, but the number of gates electrodes has to be doubled.

A Low-temperature polycrystalline silicon display system is a better class of TFT. It deploys amorphous silicon (a-Si) as the TFT. In an LTPS display system the larger and more uniform grains of polysilicon (poly-Si) allow electrons to flow 100 times faster than they do through the random-sized grains of amorphous silicon (a-Si). This higher speed allows multiplexing of RGB pixels and reduce the source output from the source driver. These LTPS display systems are commonly used in higher resolution displays. More particularly, the Low temperature polycrystalline-silicon (LTPS) display system panels are widely used in smart mobile phones or tablets.

Hereinafter, related art for displaying and touch sensing of various display devices will be described with reference to FIG. 1 to FIG. 7.

FIG. 1 is a touch screen display module connected to a touch display driver integrated circuit in accordance with the prior art. The touch scanning and display driving are done in a time-multiplexing manner. The host processor will update display information based on touch information collected from the touch display driver integrated circuit.

FIG. 2 illustrates classic arrangement of a Thin Film Transistor (TFT) sub-pixel structure in accordance with an embodiment of the prior art. In particular, the TFT sub-pixel structure includes two capacitors within each cell. Moreover, the two capacitors are Storage Capacitor (Cs) and the Liquid Crystal Capacitor (Clc). Furthermore, Storage Capacitor (Cs) and the Liquid Crystal Capacitor (Clc) are connected electrically to two common electrodes. Also, the two common electrodes are physically separated. And, the storage capacitor's common electrode is on the lower glass substrate (the TFT substrate) and the Liquid Crystal Capacitor's common electrode is on the upper glass substrate (the color filter substrate). Subsequently, the two common electrodes are electrically bonded together through multiple connectors between the lower and upper glass The Thin Film Transistor (TFT), the Storage Capacitor and the Liquid Crystal Capacitor are all connected to the Display Electrode (also called Pixel Electrode). Since the upper and lower common electrodes are electrically bonded together, the circuit diagram illustrated in FIG. 2 shows only one capacitor (which is the combine of Cs and Clc) representing the sub-pixel.

To simplify and for better understanding sub-pixel symbols R (red), G (green), B (blue) are used in the description.

FIG. 3 illustrate display driving pattern of the single-gate panel in a display device in accordance with the prior art. In particular, the single-gate panel includes source electrodes S1 to S6 and gate electrodes. The waveform is an example to turn on green pixel only. Moreover, all the source output has better display quality and power consumption owing to less toggling behavior.

FIG. 4 and FIG. 5 illustrates a z-scan and a 弓-scan display driving pattern of the dual-gate panel in a display device in accordance with the prior art. The waveforms are example to turn on green pixel only. So, there is no toggle for S2. The waveform S1 and S3 have more toggling behavior in the dual-gate panel. Moreover, the toggling causes more power consumption and could be seen as a display issue while driving heavy loading.

FIG. 6 illustrates a long h mode of touch sensing in accordance with the prior art. In the long h mode, the touch period works during display period alternatively and a dim line is displayed after each touch slot. Moreover, the long h mode has a 60 Hz display frame rate and 120 Hz touch-sensing rate.

FIG. 7 illustrates a long v mode of touch sensing in accordance with the prior art. In long v mode, the touch sensing rate is equal to the display frame rate thereby, preventing the display of dim lines. The touch sensing rate decreases if the display system slows down the display frame rate for lower power application. Moreover, the long v mode has 60 Hz display frame rate and 60 Hz touch-sensing rate for normal display mode or slow down to both 30 Hz for lower power display mode.

Mostly the display devices use long v mode for better display quality, but the touch sensing rate is limited, and the maximum is equal to display frame rate. Thus, there is a need to develop an integrated display system circuitry and a method capable of saving power consumption with integrated touch and display drivers.

SUMMARY OF THE INVENTION

Embodiments of the present disclosure relate an integrated display system circuitry capable of saving power consumption includes a display panel and driver circuitry. The display panel includes a plurality of source electrodes with a plurality of data lines and a plurality of gate electrodes further includes a gate driver directly incorporated into a thin film transistor array to form Gate on Array (GOA) electrode, a source electrode transmitting a plurality of data driving signals, a gate electrode transmitting gate driving signals, a VCOM electrode transmitting voltage driving signals, a display electrode transmitting displaying driving signals. The driver circuitry comprises a display driver IC further includes source driver operably configured to drive the source electrode and gate control to control gate driver output, a touch driver IC configured to generate the touch scan signal from a touch sensor. Within this specification, the gate electrode is similar feature of gate driver.

In accordance with an embodiment of the present invention, the integrated display system circuitry is incorporated in anyone display system selected from a dual gate display system and Low-temperature polycrystalline silicon (LTPS) display system.

In accordance with an embodiment of the present invention, the display driver IC further comprising a display phase and the display phase is configured with an even column phase and an odd column phase arranged alternatively in the display frame. In particular, the alternative arranging of the even column phase and the odd column phase in the display frame is controlled by a gate sequence of the gate electrodes. Moreover, the gate sequence of the gate electrodes further controls priority listing of the phase 1 and the phase 2 and the display direction of the phase 1 and the phase 2 in the display frame. In accordance with an embodiment of the present invention, the display driver IC is in any source direction selected from a forward source direction and a backward source direction having the same polarity with the driving phase.

In accordance with an embodiment of the present invention, the even column phase is phase 1 and an odd column phase is phase 2 and a touch sensing between phase 1 and phase 2.

In accordance with an embodiment of the present invention, phase 1 and phase 2 has anyone display direction selected from a forward display direction and a backward display direction.

In accordance with an embodiment of the present invention, the sequence of phase 1 is swapped with the sequence of phase 2.

In accordance with an embodiment of the present invention, the phase 1 and the phase 2 is arranged in a column inversion and an n-dot inversion.

In accordance with an embodiment of the present invention, the system has a lower display frame rate and higher touch sensing rate.

In accordance with an embodiment of the present invention, the lower display frame rate ranges from about 60 Hz and the higher touch sensing rate is about 120 Hz for dual gate display system.

In accordance with an embodiment of the present invention, for lower power application the display system skips a group by gate control to reduce display frame rate but still keep the touch sensing rate. In an example, when the display system skips 1 group of phase 1 and phase 2, the display frame rate is reduced to 30 Hz but touch sensing rate remains at 120 Hz.

In accordance with an embodiment of the present invention, the source electrode is operably configured to output a plurality of data driving signals based on the gate sequence of the gate electrodes.

In accordance with an embodiment of the present invention, the display frame for the Low-temperature polycrystalline silicon (LTPS) display system comprises a plurality of driving phases and wherein the touch sensing is operably configured between each display phase of the plurality of driving phases.

In accordance with an embodiment of the present invention, the touch sensing rate of the Low-temperature polycrystalline silicon (LTPS) display system with n-multiplexers is n times the display frame rate.

A power saving method for an integrated display system circuitry including identifying a number of multiplex (n) of a display panel, resetting a phase counter (k) value to 1, setting the multiplexer selection the display panel with the phase counter value (k), driving the display panel, scanning a touch sensor, completing the phase counter (k) and increasing the phase counter by 1 and evaluating whether the phase counter (k) is greater than the number of multiplex (n).

If the phase counter (k) is greater than the number of multiplex then the phase counter (k) value is reset to 1.

If the phase counter (k) is not greater than the number of multiplex (n) then the saving method continues the scan.

In accordance with an embodiment of the present invention, the method further includes selecting a sequence of the even column phase and the odd column phase and selecting a gate scan direction and the gate scan direction is a forward display direction and a backward display direction. In particular, the even column phase is phase 1 and the odd column phase is phase 2.

In accordance with an embodiment of the present invention, the multiplex is selected from a dual gate panel with at least two multiplex and a Low-temperature polycrystalline silicon LTPS panel with 3 multiplexers, 6 multiplexers and n-multiplexers.

In accordance with an embodiment of the present invention, the display driver IC is in anyone source direction selected from a forward source direction and a backward source direction having a polarity similar to the display phase.

It is to be understood that both the foregoing general description and the following detailed description of the present invention are exemplary and explanatory and are intended to provide further explanation of the invention as claimed.

BRIEF DESCRIPTION OF THE DRAWINGS

So that the manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention relates to an integrated display system circuitry and a method capable of saving power consumption thereof.

The principles of the present invention and their advantages are best understood by referring to FIGS. 8 to FIGS. 15. In the following detailed description of illustrative or exemplary embodiments of the disclosure, specific embodiments in which the disclosure may be practiced are described in sufficient detail to enable those skilled in the art to practice the disclosed embodiments.

The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Various embodiments of the present invention relate to an integrated display system circuitry and a method capable of saving power consumption thereof.

The integrated display system circuitry capable of saving power consumption, includes a display panel having a plurality of source electrodes with a plurality of data lines and a plurality of gate electrodes further includes a gate driver transmitting gate driving signals and the gate electrode is being directly incorporated into a thin film transistor array to form Gate on Array (GOA) electrode, a source electrode transmitting a plurality of data driving signals, a VCOM electrode transmitting voltage driving signals, a display electrode transmitting displaying driving signals. The integrated display system circuitry also includes a driver circuitry. In particular, the driver circuitry further includes a display driver IC having a source driver operably configured to drive the source electrode, gate control to the gate driver output and a touch driver IC configured to generate a touch scan signal from a touch sensor. In particular, the integrated display system circuitry is incorporated in anyone panel selected from a dual gate display panel and a Low-temperature polycrystalline silicon (LTPS) display panel.

Figure 1:
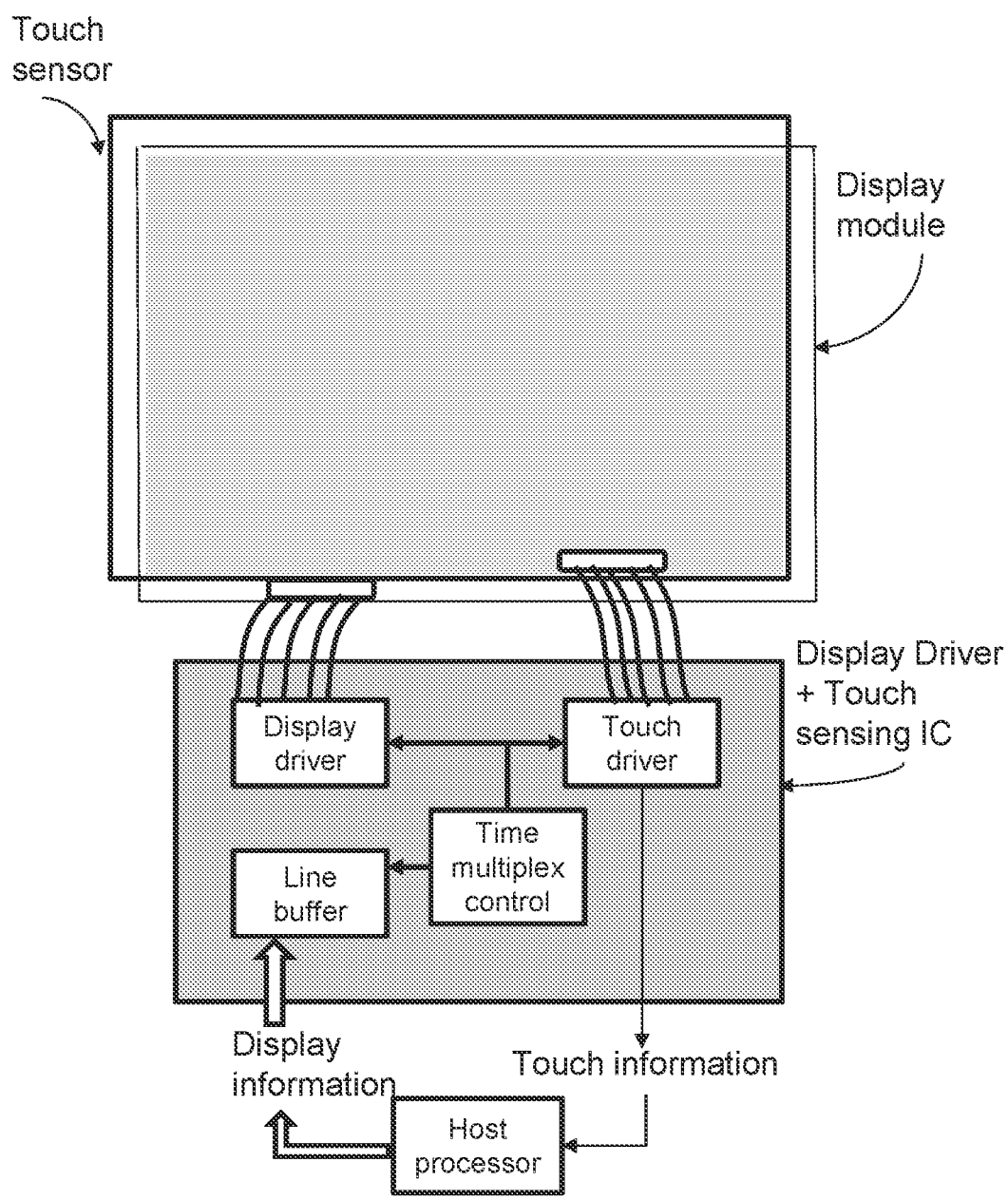
FIG. 1 is a touch screen display module connected to a touch display driver integrated circuit in accordance with the prior art.
Figure 2:
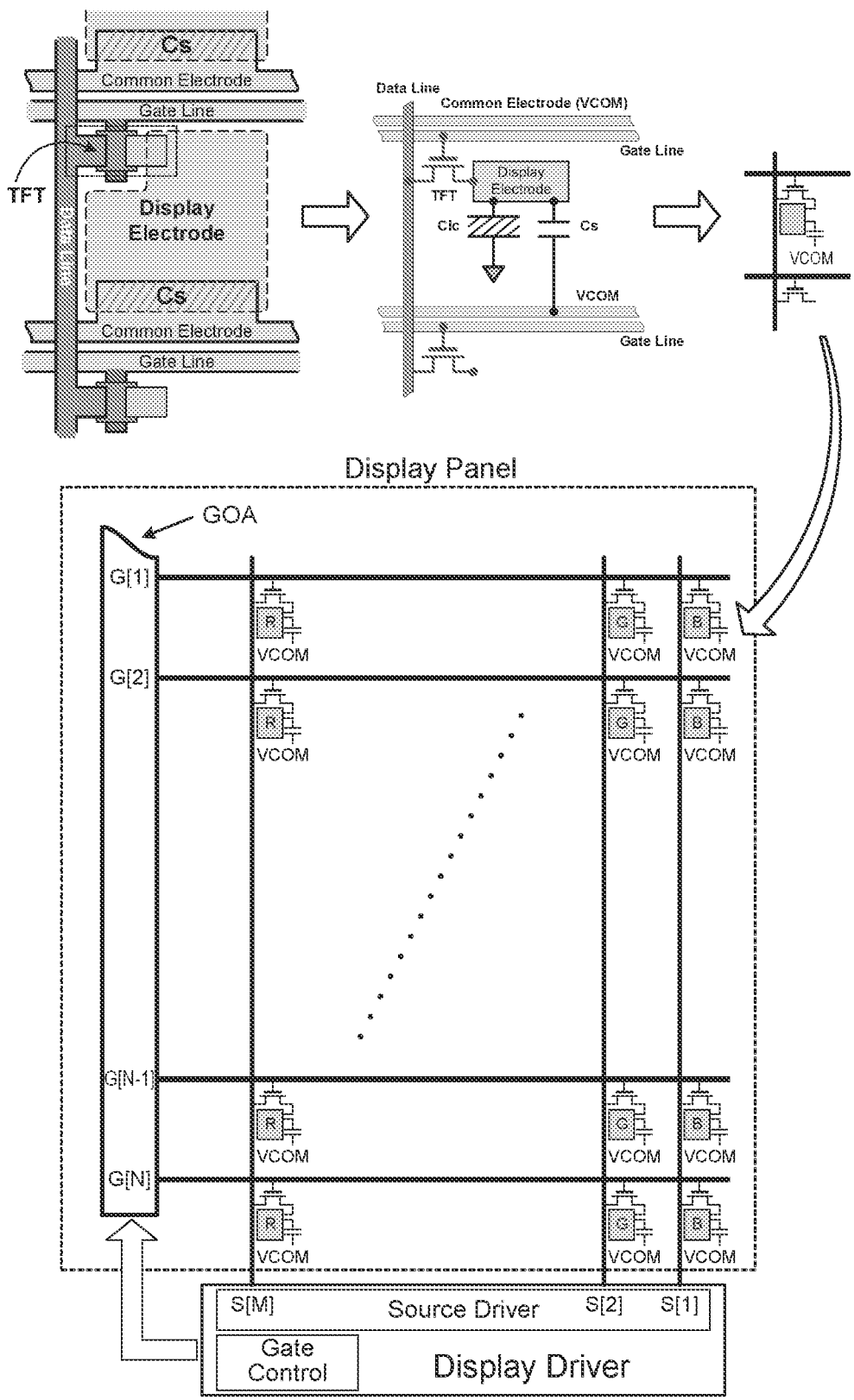
FIG. 2 illustrates classic arrangement of a Thin Film Transistor (TFT) sub-pixel structure in accordance with the prior art.
Figure 3:
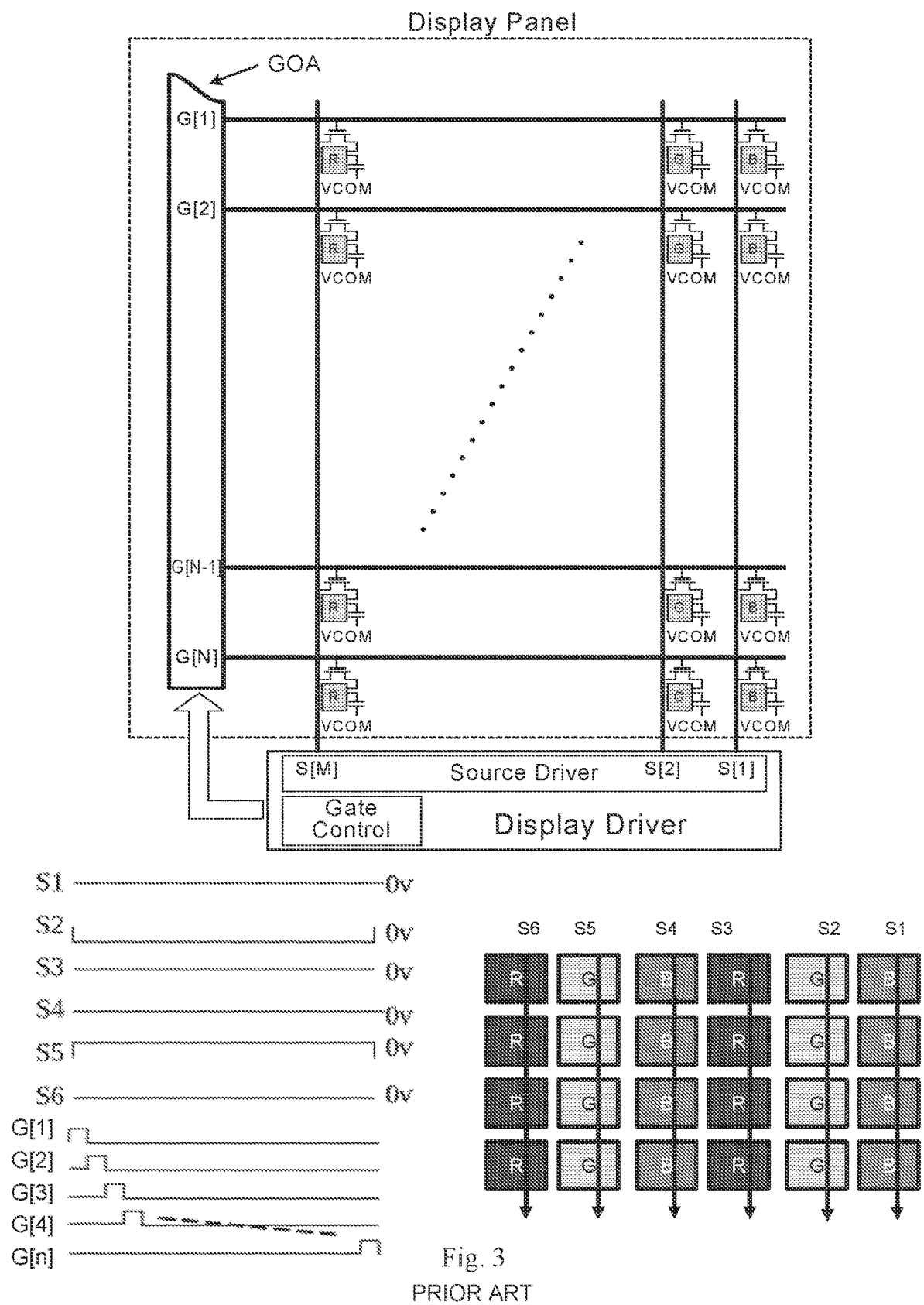
FIG. 3 illustrates a display driving pattern of source waveform of a single-gate panel in accordance with the prior art.
Figure 4:
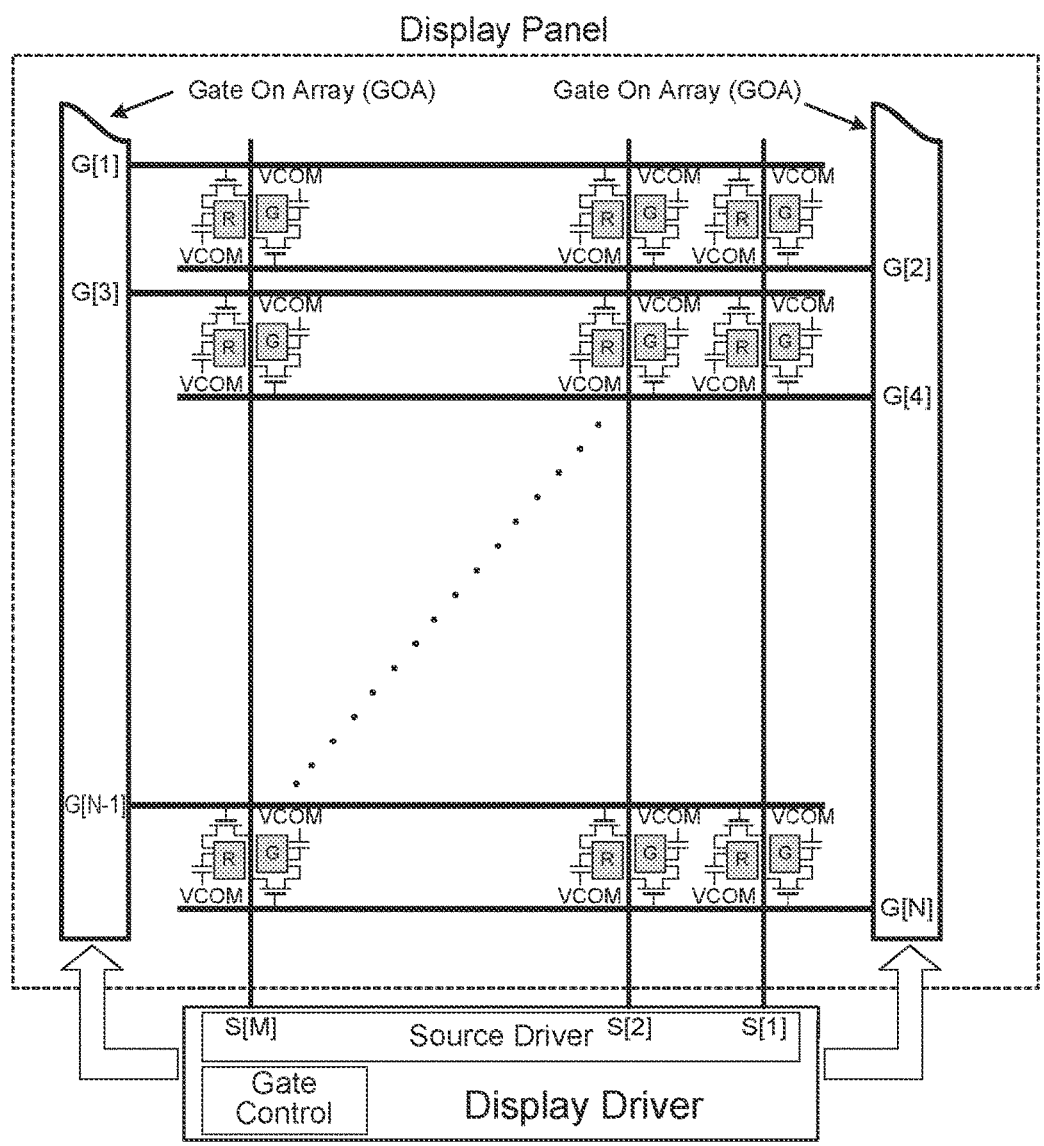
FIG. 4 illustrates a z-scan display driving pattern of the source waveform of a dual-gate panel in accordance with the prior art.
Figure 4:
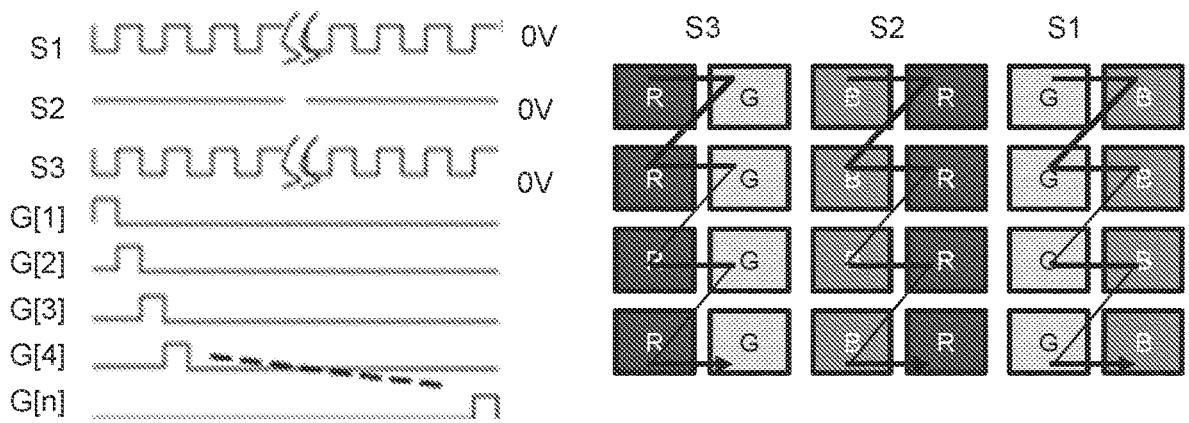
Figure 5:
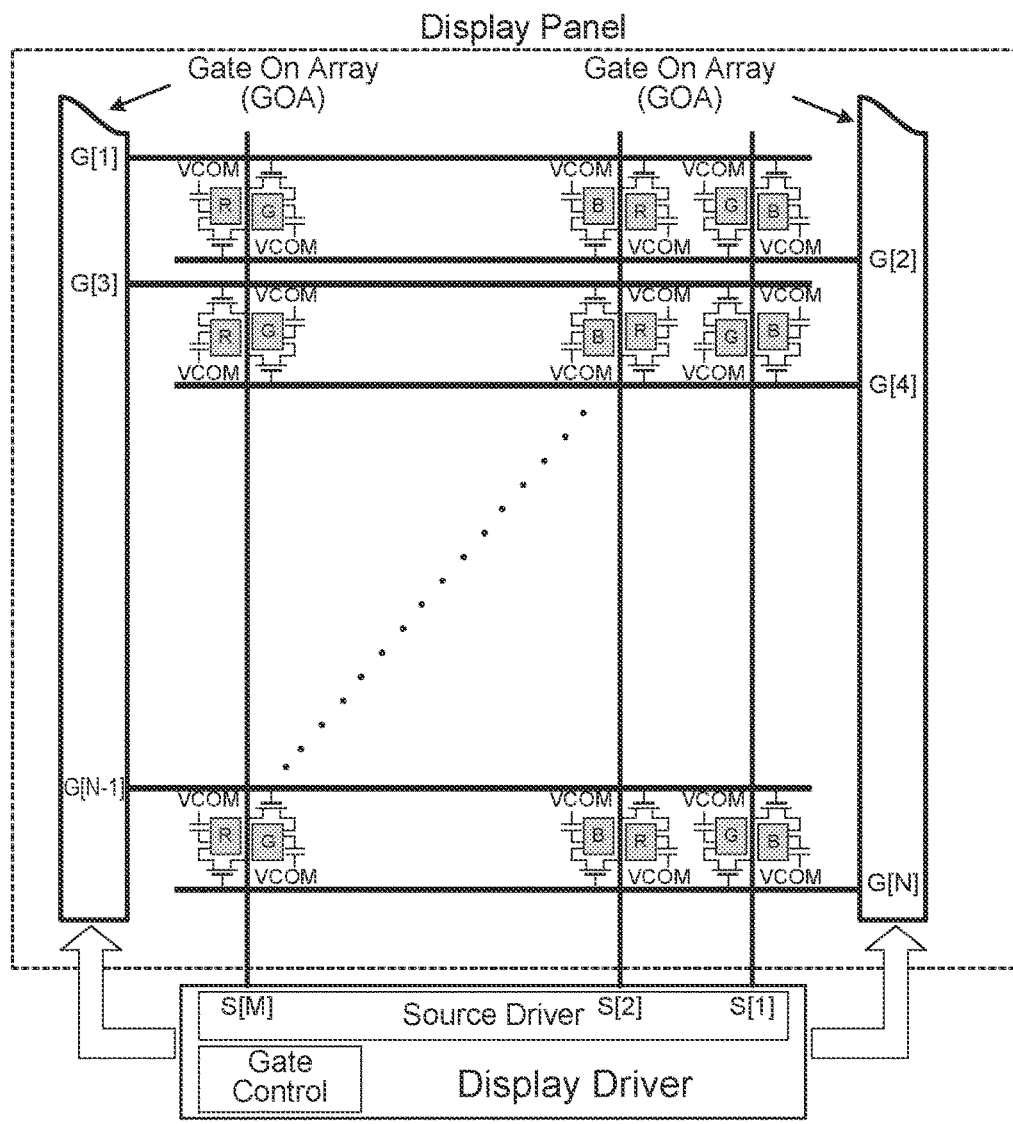
FIG. 5 illustrates a 弓-scan display driving pattern of the source waveform of the dual-gate panel in accordance with the prior art.
Figure 5:
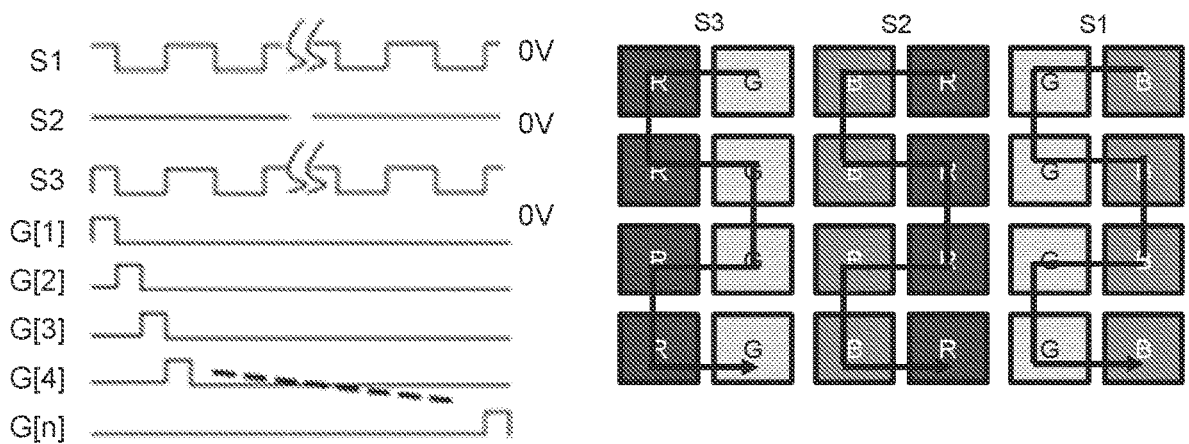
Figure 6:
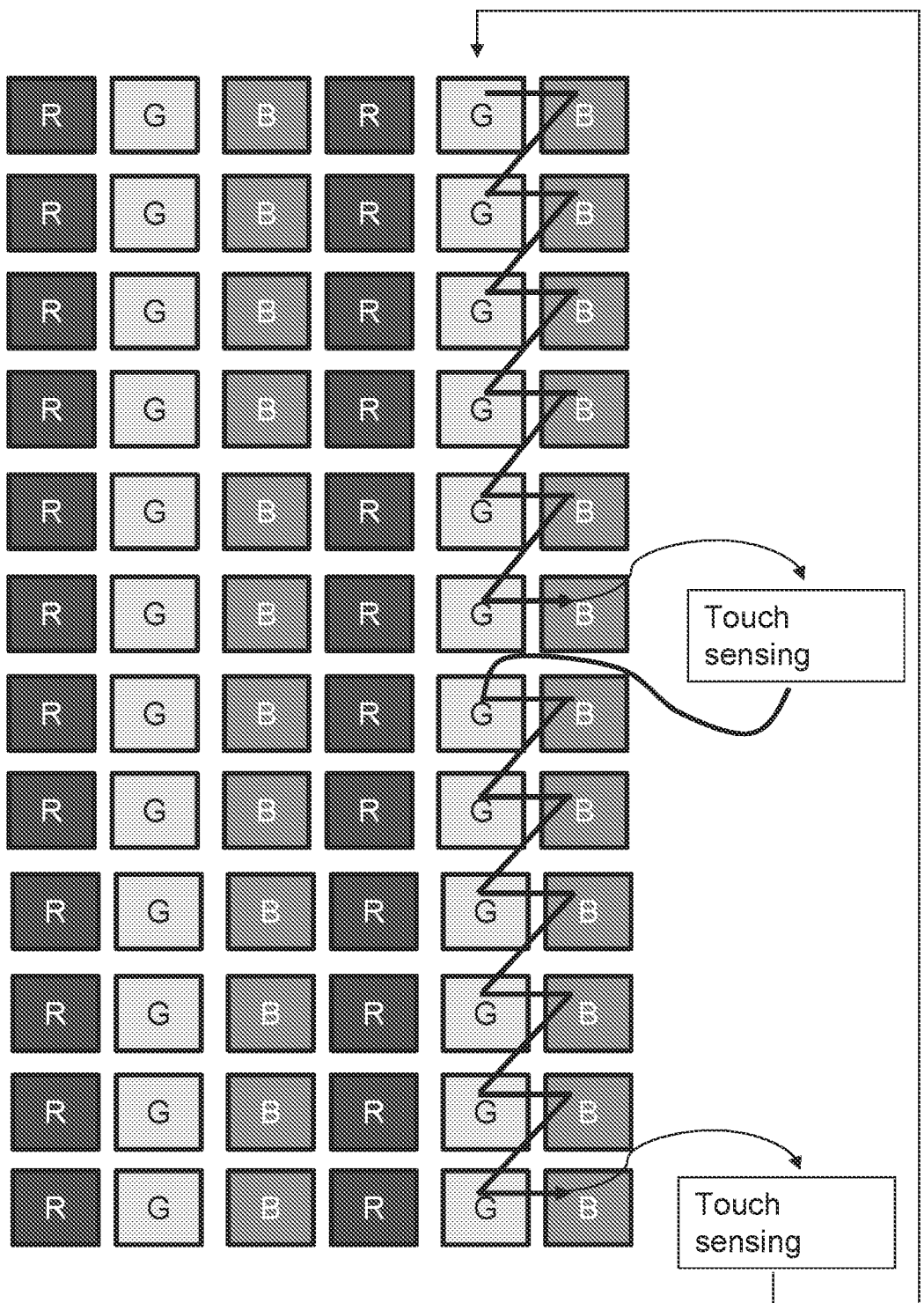
FIG. 6 illustrates a long h mode of touch sensing in accordance with the prior art.
Figure 7:
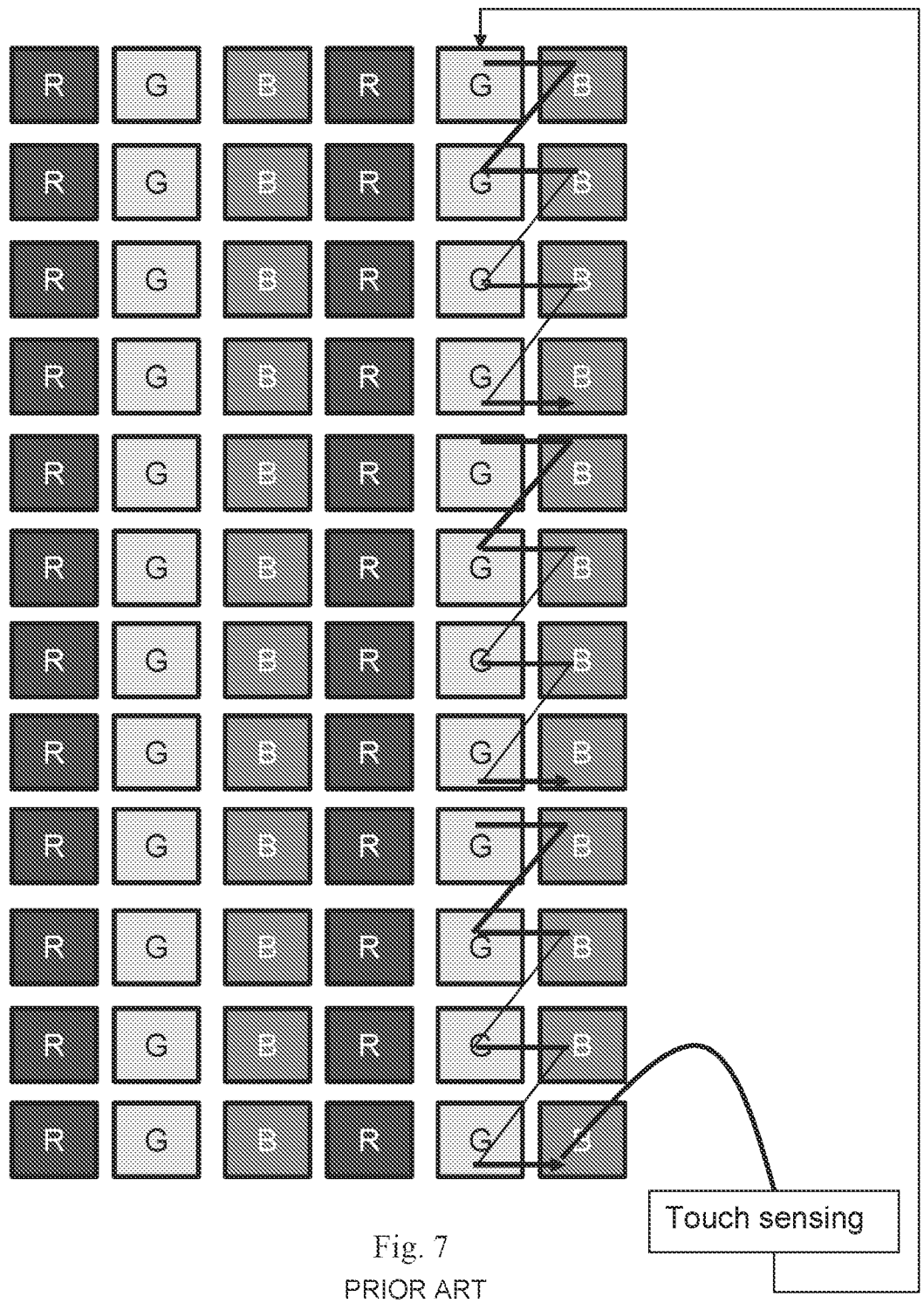
FIG. 7 illustrates a long v mode of touch sensing in accordance with the prior art.
Figure 8:
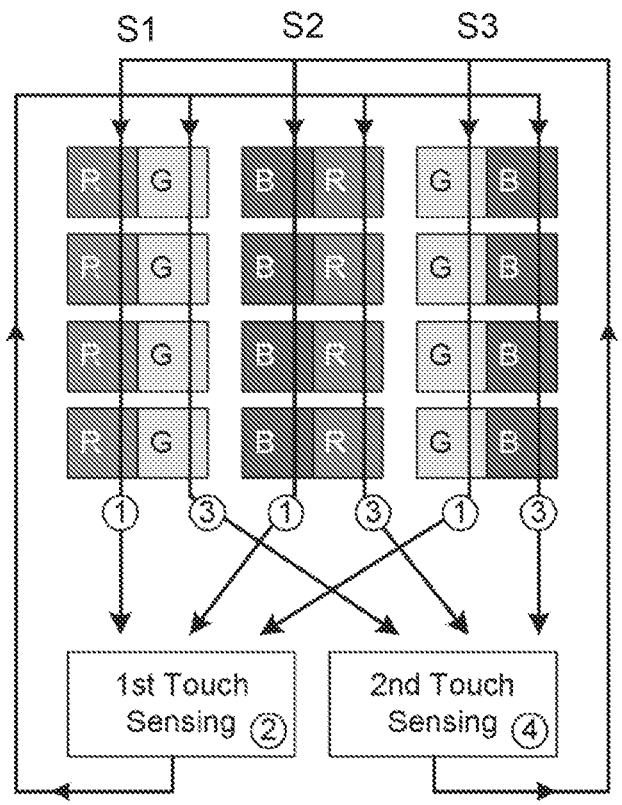
FIG. 8 illustrates a display driving step in a dual gate display system in accordance with an embodiment of the present invention.
Figure 8:
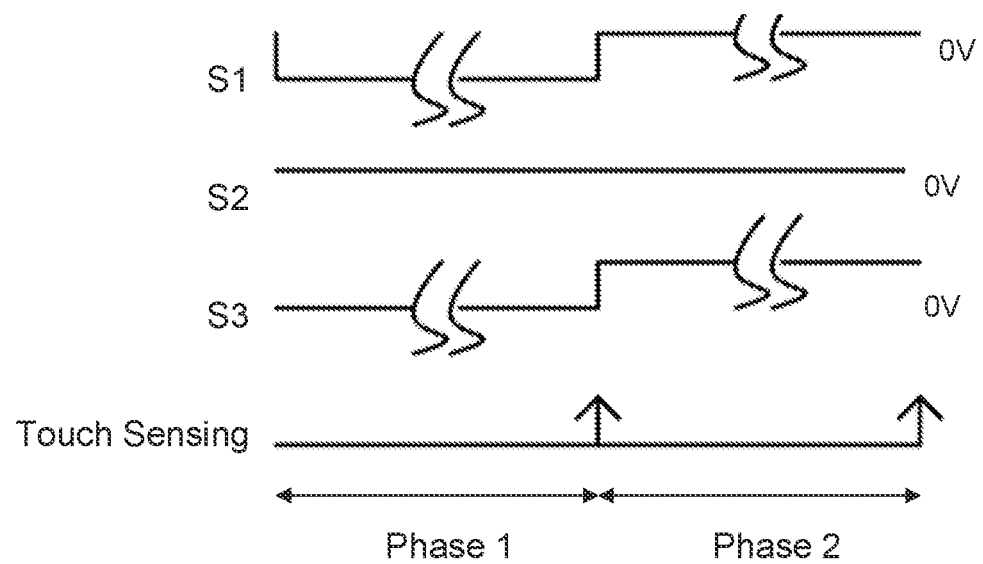

FIG. 8 illustrates a display driving step in a dual gate display system in accordance with an embodiment of the present invention. In particular, the first step to display driving for phase 1, the second step is the first touch sensing, the third step to display driving for phase 2 and the last step is the second touch sensing. The whole display frame is completed and continue to next frame. The waveform is an example to turn on green pixel only. So no toggle for S2. Moreover, the source waveform has very less toggling behavior.

Figure 9:
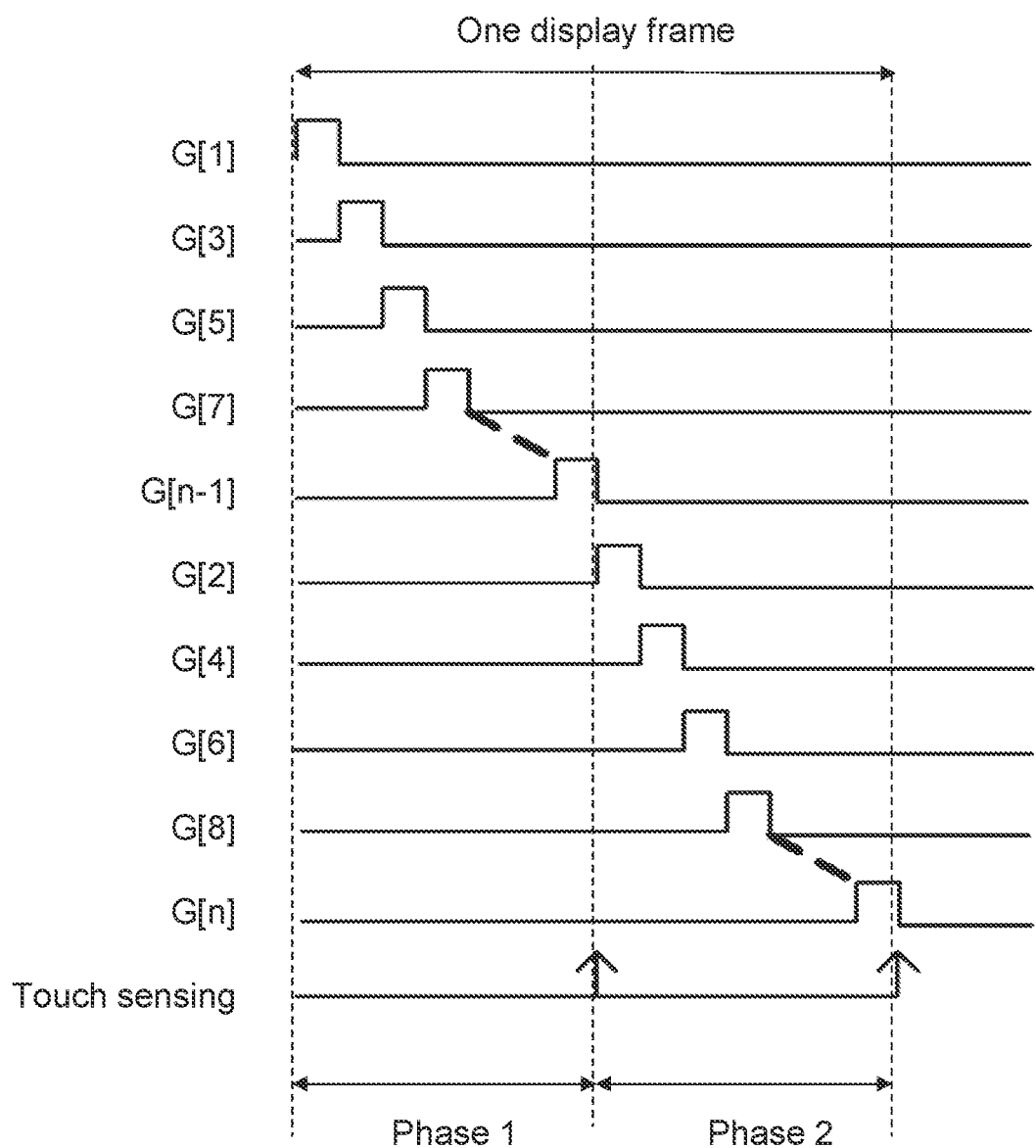
FIG. 9 illustrates a display driving sequence of phase 1 and phase 2 in the dual gate display system in accordance with an embodiment of the present invention.

FIG. 9 illustrates a display driving sequence of phase 1 and phase 2 in the dual gate display system in accordance with one embodiment of the present invention. In particular, the display phase drives even column and odd column alternatively. The even column is phase 1 and the odd column is phase 2. Furthermore, the dual gate panel with alternate phase 1 and phase 2 is further configured to perform touch sensing between phase 1 and phase 2 of the display frame. The dual gate display system has a lower display frame rate about 60 Hz and a higher touch sensing rate about 120 Hz.

In accordance with an embodiment of the present invention, for lower power application the display system skips a group by gate control to reduce display frame rate but still keep the touch sensing rate.

In an example, when the display system skips 1 group of phase 1 and phase 2, the display frame rate is reduced to about 30 Hz but touch sensing rate remains at about 120 Hz. In particular, the dual gate display system has same touch rate with different display frame rate without any horizontal dim lines.

In accordance with an embodiment if the present invention, phase 1 and phase 2 complete one whole frame of the data. Moreover, phase 1 and phase 2 has anyone display direction selected from a forward display direction and a backward display direction.

Figure 10:
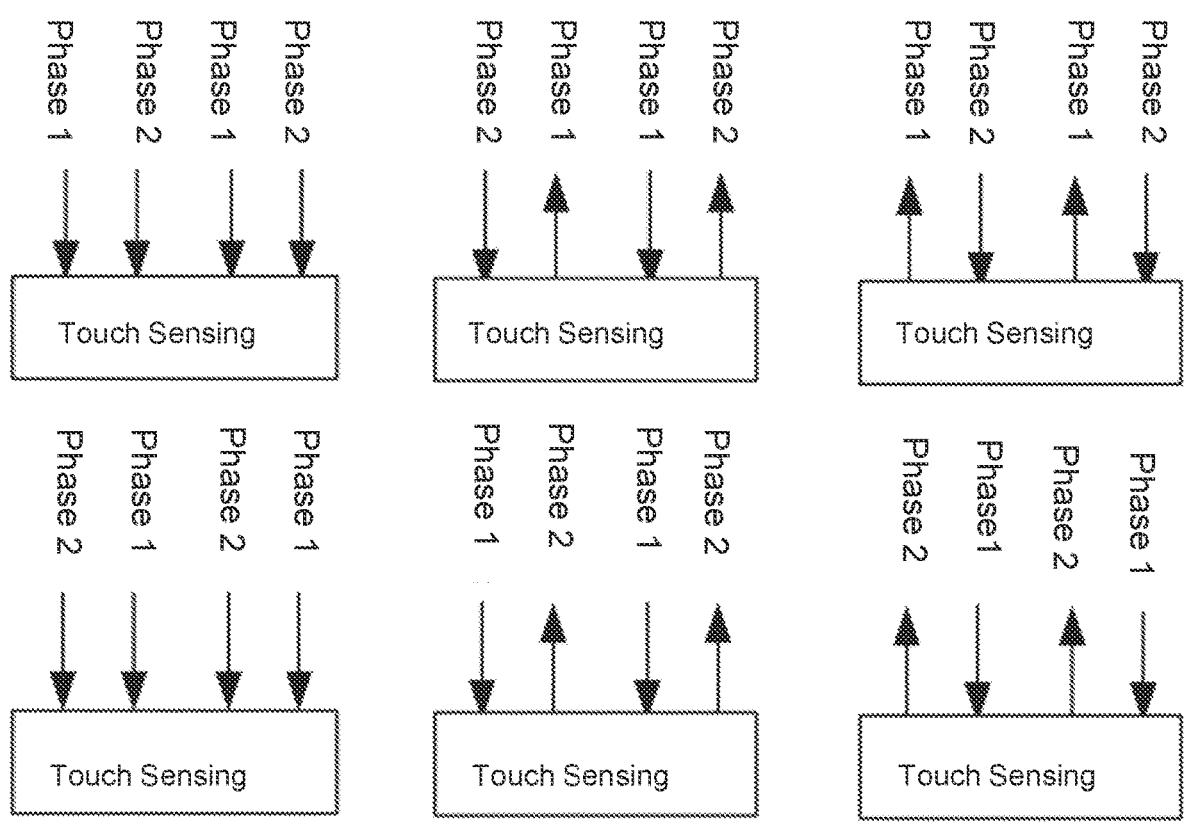
FIG. 10 illustrates a plurality of touch sensing between phase 1 and phase 2 in the dual gate display system in accordance with an embodiment of the present invention.

FIG. 10 illustrates a plurality of touch sensing between phase 1 and phase 2 in the dual gate display system in accordance with an embodiment of the present invention. In particular, the touch sensing is between phase 1 and phase 2. Moreover, phase 1 and phase 2 is arranged in anyone inversion selected from a column inversion and n-dot inversion based on the display quality. The column inversion receives data signals during a display period and the N-dot inversion receives the data signals during a blanking period.

Figure 11:
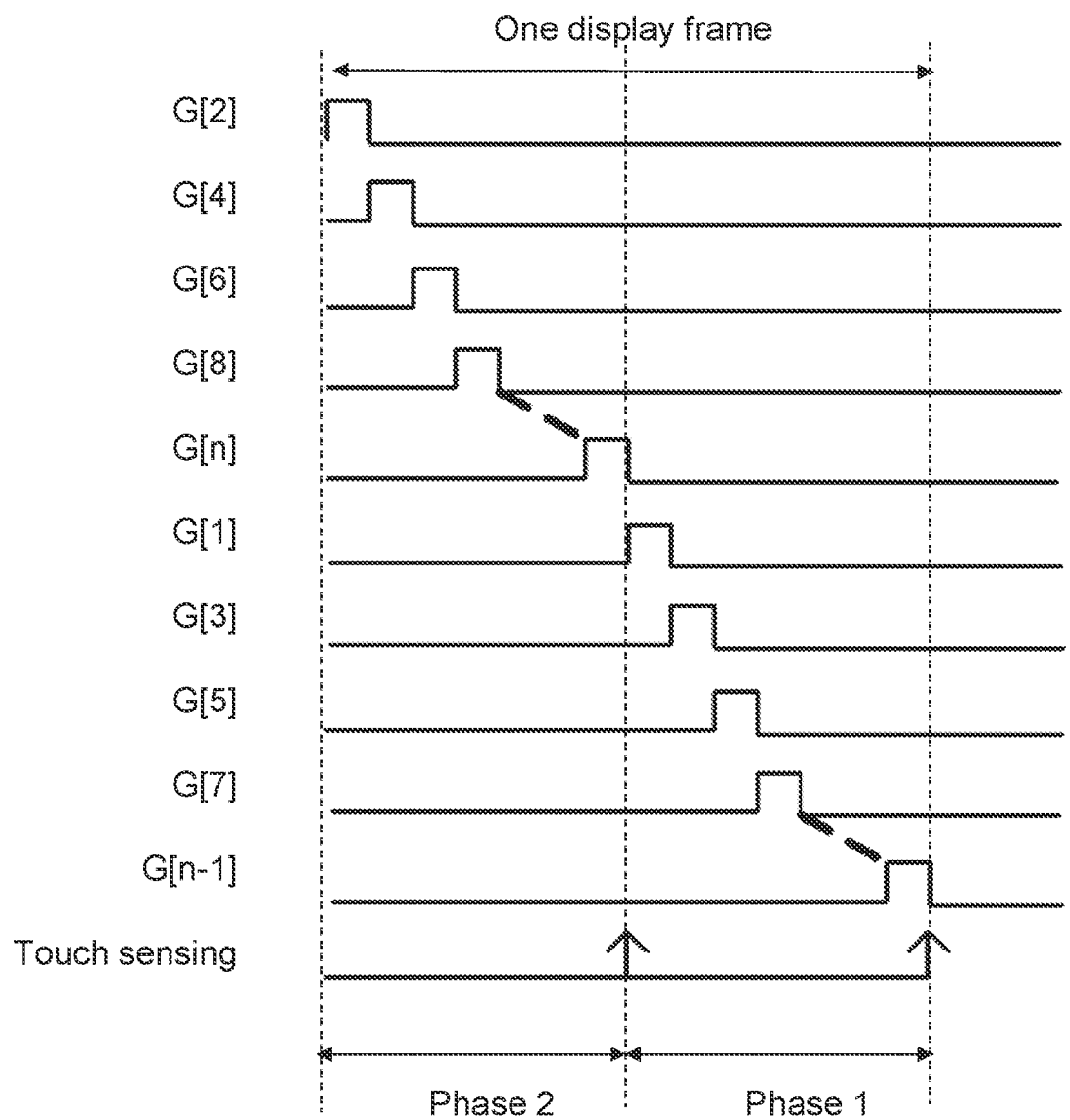
FIG. 11 illustrates a display driving sequence of phase 1 and phase 2 in the dual gate display system accordance with one embodiment of the present invention.

In accordance with one or more embodiments of the present invention, the sequence of phase 1 is swapped with the sequence of phase 2. In particular, the swapping depends on a gate sequence of the gate electrode. And, the direction of phase 1 and phase 2 is controlled by the display driver FIG. 11 illustrates a display driving sequence of phase 1 and phase 2 in the dual gate display system in accordance with one embodiment of the present invention. In particular, the phase 2 and the phase 1 have the forward display direction in the display frame. The gate sequence in phase 2 is represented by G[2], G[4], . . . , G[n−2] and gate sequence in phase 1 is represented by G[1], G[3], . . . , G[n−1].

Figure 12:
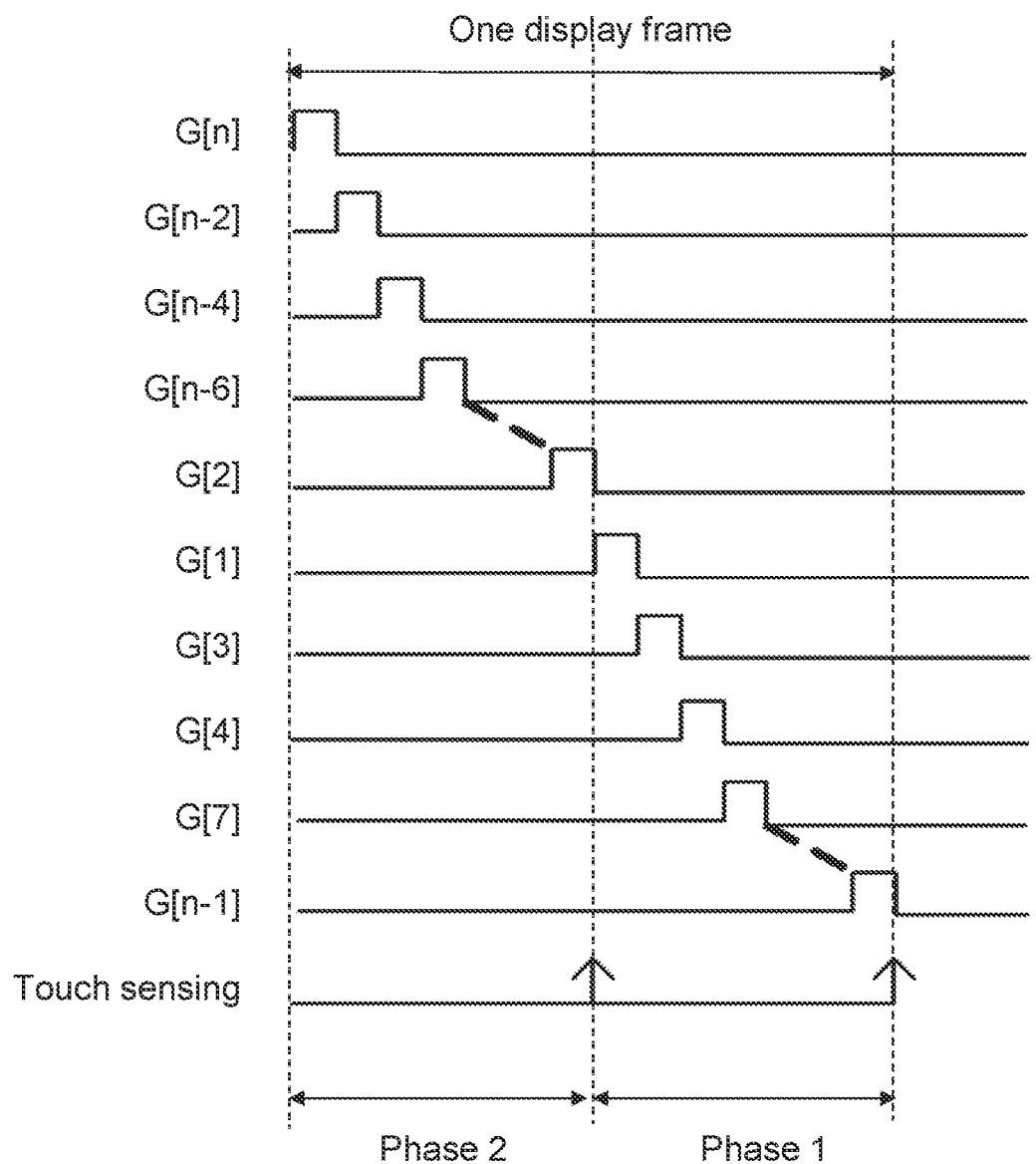
FIG. 12 illustrates a display driving sequence of phase 1 and phase 2 in the dual gate display system in accordance with another embodiment of the present invention.

FIG. 12 illustrates a display driving sequence of phase 1 and phase 2 in the dual gate display system in accordance with another embodiment of the present invention. In particular, the phase 2 has a backward display direction and phase 1 has the forward display direction in the display frame. The gate sequence in phase 2 is represented by G[n], G[n−2], . . . , G[2] and gate sequence in phase 1 is represented by G[1], G[3], . . . , G[n−1].

Figure 13:
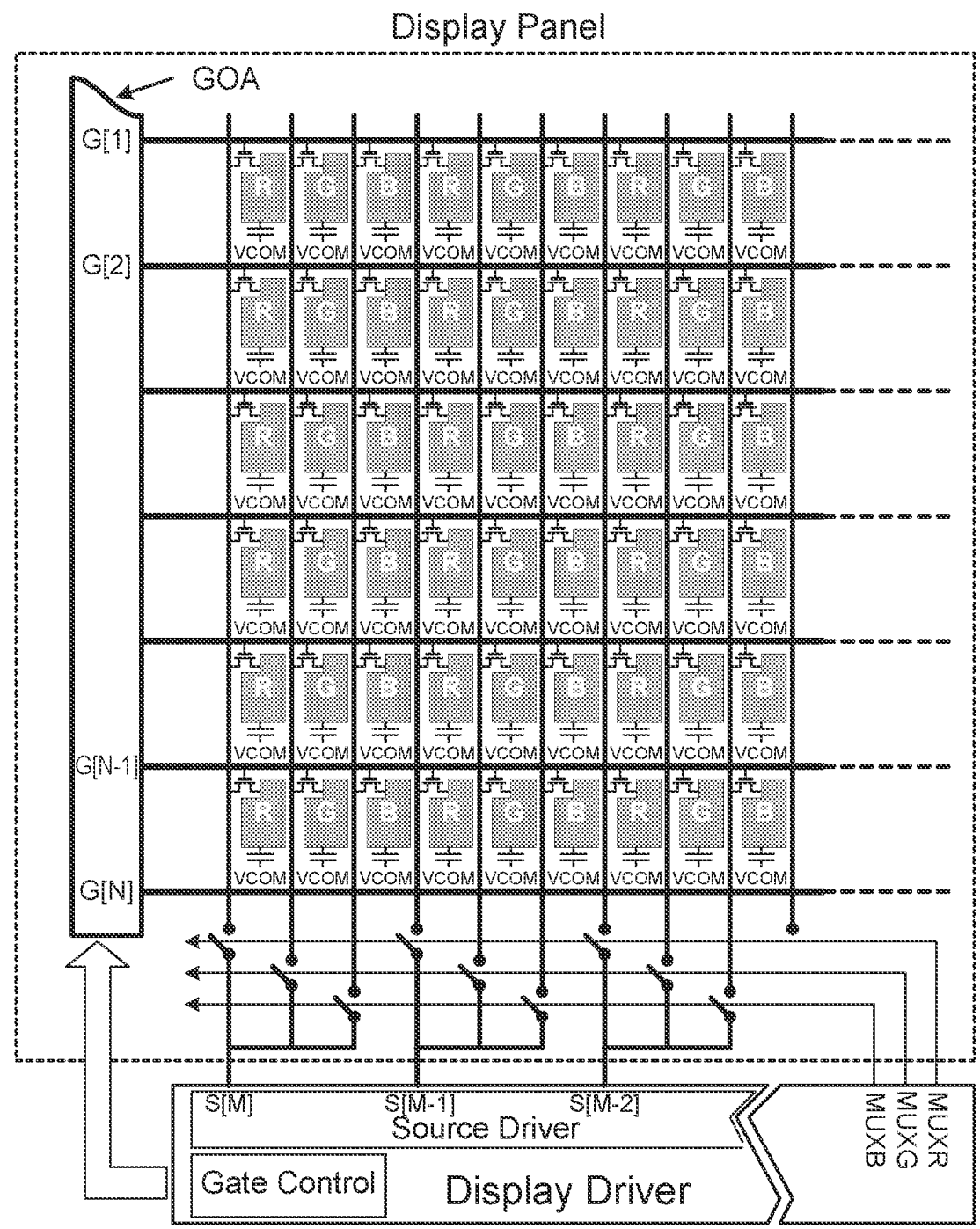
FIG. 13 illustrates the structure of Low-temperature polycrystalline silicon (LTPS) display system with 3 multiplexers in accordance with another embodiment of the present invention.
Figure 14:
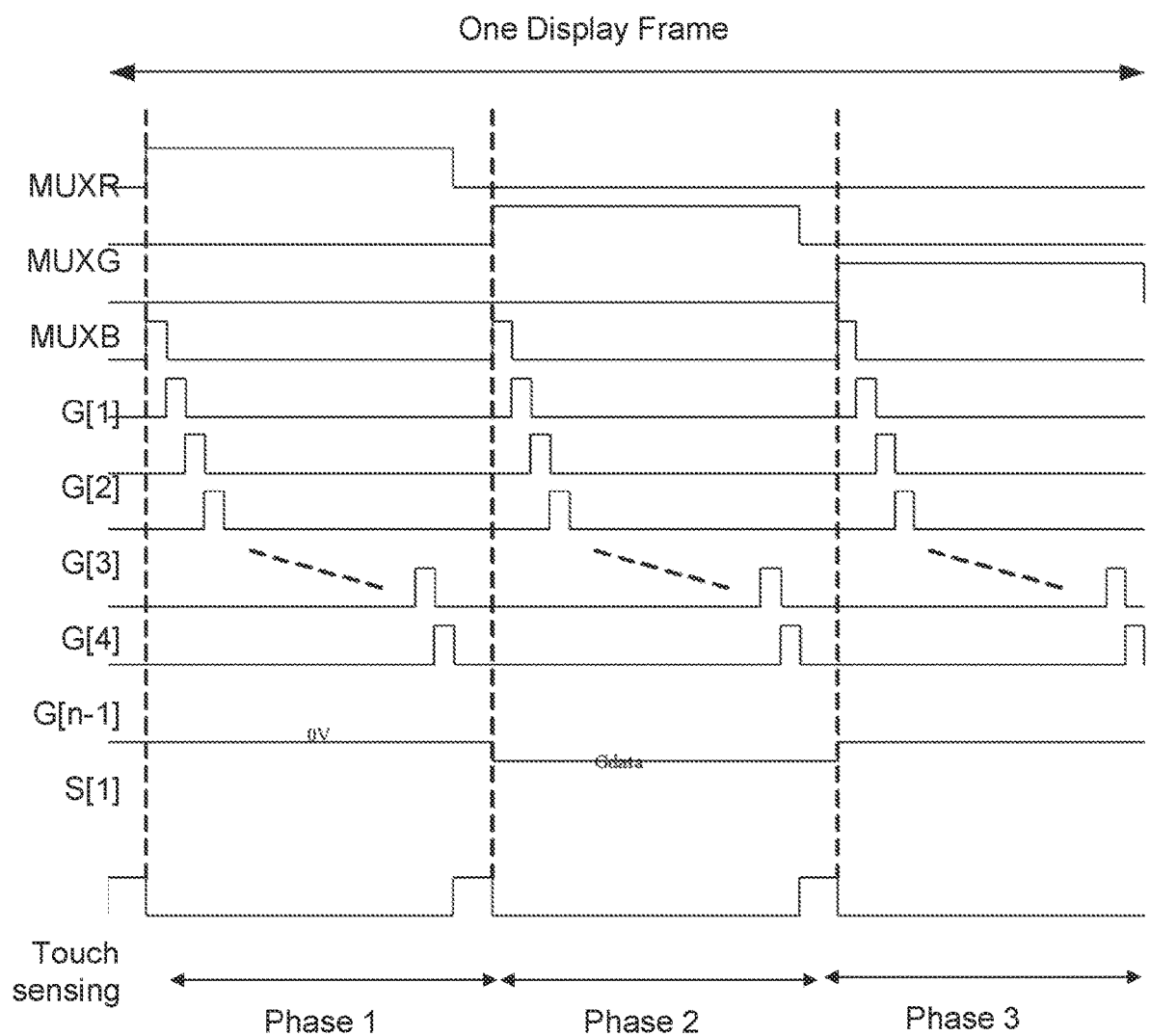
FIG. 14 illustrates display driving sequence in the Low-temperature polycrystalline silicon (LTPS) display system with 3 multiplexers in accordance with yet another embodiment of the present invention.

FIG. 13 illustrates the structure of the Low-temperature polycrystalline silicon (LTPS) display system with 3 multiplexers in accordance with an embodiment of the present invention. The Low-temperature polycrystalline silicon (LTPS) display system further includes a plurality of display phases. And, the touch sensing is operably configured within each display phase of the plurality of display phases of a display frame. FIG. 14 illustrates driving sequence in the display frame in a Low-temperature polycrystalline silicon (LTPS) display system with 3 multiplexers in accordance with yet another embodiment of the present invention. In particular, the LTPS panel with 3 multiplexers has a display frame rate about 60 Hz and touch sensing rate about 180 Hz.

In accordance with another embodiment of the present invention, the Low-temperature polycrystalline silicon (LTPS) display system is an LTPS panel with 3 multiplexers, 6 multiplexers and an LTPS panel with n-multiplexers. For complete frame display, the LTPS panel with n-multiplexers completes n phases. Moreover, the LTPS panel is operably configured to perform touch sensing among the n phases. Furthermore, the touch sensing rate of a multiplex with n-multiplexers is n times the display frame rate. Thus, the touch sensing rate is higher than display frame rate. In particular for devices having 3 multiplexes or 6 multiplexes uses the plurality of display phases to complete a whole display frame.

In accordance with an embodiment of the present invention, the display driver IC is in anyone source direction selected from a forward source direction and a backward source direction having a polarity similar with the driving phase.

In accordance with an embodiment of the present invention, each display phase has the forward displaying direction or the backward displaying direction with any inversion selected from column inversion and n-dot inversion for better display quality.

Figure 15:
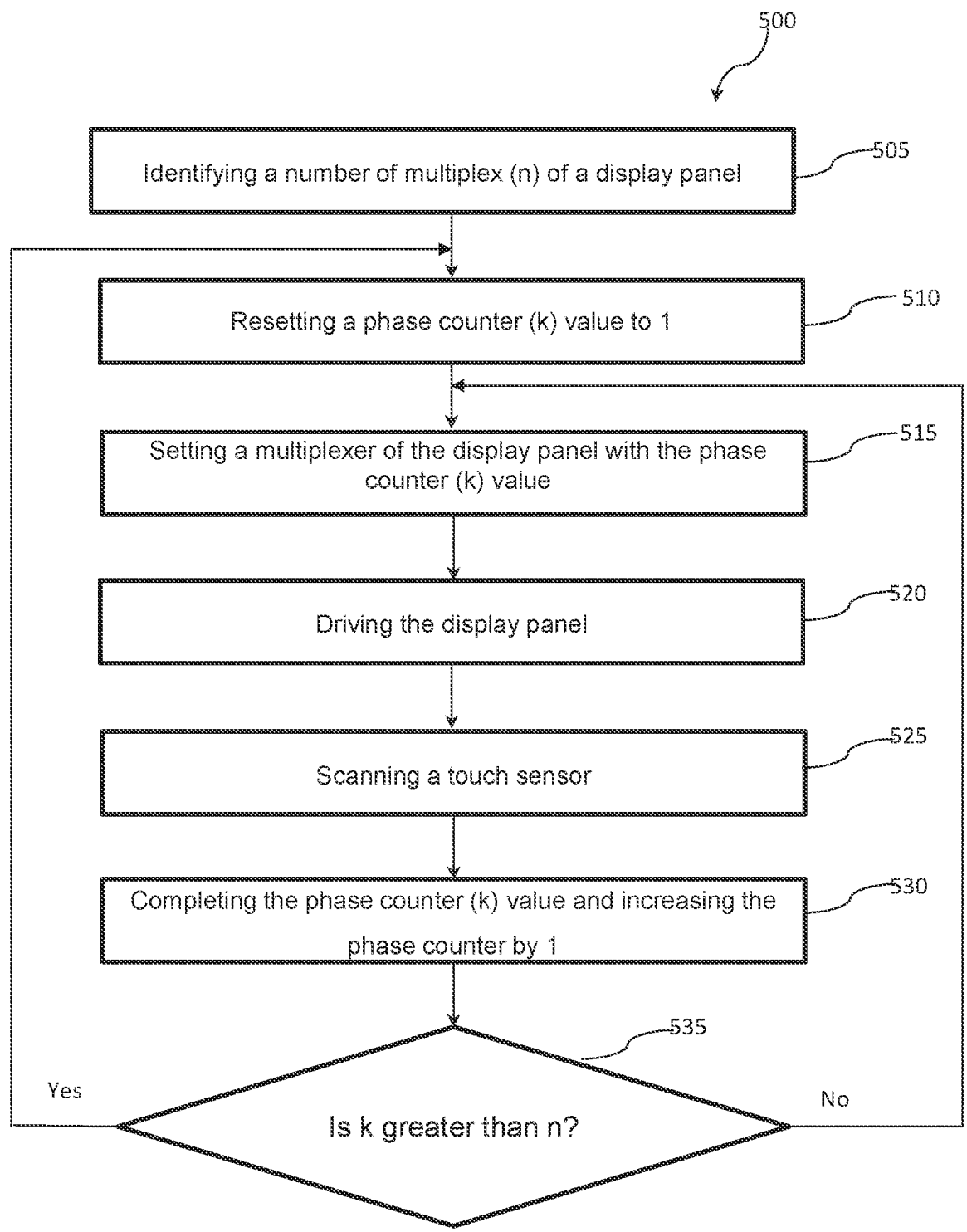
FIG. 15 is a flow chart illustrating a method for an integrated display system circuitry capable of saving power consumption in accordance with an embodiment of the present invention.

FIG. 15 is a flow chart illustrating a method for an integrated display system circuitry capable of saving power consumption, in accordance with an embodiment of the present invention. The method for the integrated display system circuitry capable of saving power consumption is incorporated in anyone display system selected from a dual gate display system and a Low-temperature polycrystalline silicon (LTPS) display system.

The method 500 starts at step 505. At step 505, a number of multiplex (n) of a display panel is identified.

Step 505 proceeds to step 510. At step 510, a phase counter (k) value is reset to 1.

Step 510 proceeds to step 515. At step 515, the multiplexer selection in the display panel is set with the phase counter value (k).

Step 515 proceeds to step 520. At step 520, the display panel is driven.

Step 520 proceeds to step 525. At step 525, a touch sensor is scanned.

Step 525 proceeds to step 530. At step 530, the phase counter (k) is completed and the phase counter is increased by 1.

Step 530 proceeds to step 535. At step 535, an evaluation is made whether the phase counter (k) is greater than the number of multiplex (n).

If the evaluation is YES and the phase counter (k) is greater than the number of multiplex (n). The method proceeds to step 510, to reset the phase counter (k) value to 1.

If the evaluation is NO and the phase counter (k) is not greater than the number of multiplex (n). The method 500 continues the touch scan. In accordance with an embodiment of the present invention, the method further includes selecting a sequence for a phase 1 and a phase 2 and selecting a gate scan direction. The phase 1 and a phase 2 are arranged alternatively in the display frame. Moreover, the gate sequence of the gate electrodes controls alternative arranging of phase 1 and phase 2, priority listing of phase 1 and phase 2 and the display direction of phase 1 and phase 2 in the display frame. Furthermore, phase 1 and phase 2 has anyone display direction selected from forward display direction and a backward display direction.

In accordance with an embodiment of the present invention, the source electrode is operably configured to output a plurality of data driving signals based on the gate sequence of the gate electrodes.

In accordance with an embodiment of the present invention, the method further includes touch sensing between the phase 1 and the phase 2. In particular, the even column phase is phase 1 and an odd column phase is phase 2.

In accordance with an embodiment of the present invention, the display driver IC further comprising a display phase and the display phase is configured with an even column phase and an odd column phase arranged alternatively in the display frame.

In accordance with an embodiment of the present invention, the display driver IC is in any source direction selected from a forward source direction and a backward source direction having the same polarity with the driving phase.

In accordance with an embodiment of the present invention, sequence of the phase 1 is swapped with sequence of the phase 2.

In accordance with an embodiment of the present invention, the phase 1 and the phase 2 is arranged in a column inversion and an n-dot inversion.

In accordance with an embodiment of the present invention, the system has a lower display frame rate and higher touch sensing rate.

In accordance with an embodiment of the present invention, the lower display frame rate ranges from about 60 Hz and the higher touch sensing rate ranges is about 120 Hz.

In accordance with an embodiment of the present invention, the display system skips groups by gate electrode control to reduce display frame rate. Moreover, the system has same touch rate with different display frame rate without any horizontal dim line.

In accordance with an embodiment of the present invention, the display frame for the Low-temperature polycrystalline silicon (LTPS) display system comprises a plurality of driving phases and wherein the touch sensing is operably configured between each display phase of the plurality of driving phases. Thus, the touch sensing rate is higher than display frame rate. In particular for devices having 3 multiplexes or 6 multiplexes uses the plurality of display phases to complete a whole display frame.

In accordance with an embodiment of the present invention, the touch sensing rate of the Low-temperature polycrystalline silicon (LTPS) display system with n-multiplexers is n times the display frame rate.

In accordance with an embodiment of the present invention, the touch sensing occurs between the phases.

In accordance with an embodiment of the present invention, the source driver IC is in anyone source direction selected from a forward source direction and a backward source direction having a polarity similar with the driving phase.

In accordance with an embodiment of the present invention, the Low-temperature polycrystalline silicon LTPS display system further comprises a plurality of driving phases and the touch sensing is operably configured between each display phase of the plurality of display phases.

In accordance with an embodiment of the present invention, each display phase has the forward displaying direction or the backward displaying direction with any inversion selected from column inversion and n-dot inversion for better display quality.

In accordance with an embodiment of the present invention, the multiplex is selected from a dual gate panel with at least two multiplex and a Low-temperature polycrystalline silicon LTPS panel with 3 multiplexers, 6 multiplexers and n-multiplexers.

The present invention of integrated display system circuitry capable of saving power consumption has the lower display frame rate and higher touch sensing rate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An integrated display system circuitry capable of saving power consumption, comprising:
   a display panel including a plurality of source electrodes with a plurality of data lines and a plurality of gate electrodes further comprising:
   a gate driver transmitting gate driving signals and the gate electrode being directly incorporated into a thin film transistor array to form Gate on Array (GOA) electrode;
   a source electrode transmitting a plurality of data driving signals based on a gate sequence of a gate electrode;
   a VCOM electrode transmitting voltage driving signals;
   a display electrode transmitting displaying driving signals; and
   a driver circuitry comprising:
   a display driver IC comprising a source driver operably configured to drive the source electrode and gate control to a gate driver output; and
   a touch driver IC configured to generate a touch scan signal from a touch sensor;
   wherein the integrated display system circuitry is incorporated in anyone panel selected from a dual gate display panel and a Low-temperature polycrystalline silicon (LTPS) display panel;
   wherein the display driver IC further comprises a display phase and the display phase is configured with alternative arranging of a phase 1 and a phase 2 in a display frame;
   wherein the integrated display system circuitry has a lower display frame rate and a higher touch sensing rate; and
   wherein a touch sensing rate of the Low-temperature polycrystalline silicon (LTPS) display panel with n-multiplexers is n times display frame rate.

2. The integrated display system circuitry as claimed in claim 1, wherein the display driver IC is in anyone source direction selected from a forward source direction and a backward source direction having a polarity similar with a driving phase.

3. The integrated display system circuitry as claimed in claim 1, wherein a touch sensing occurs between the phase 1 and the phase 2.

4. The integrated display system circuitry as claimed in claim 1, wherein a sequence of the phase 1 is swapped with a sequence of the phase 2 and swapping depends on a gate sequence of the gate electrode.

5. The integrated display system circuitry as claimed in claim 4, wherein the gate sequence of the gate electrode is configured to further control a priority listing of the phase 1 and the phase 2 and a display direction of the phase 1 and the phase 2 in the display frame.

6. The integrated display system circuitry as claimed in claim 1, wherein the phase 1 and the phase 2 is arranged in a column inversion and an n-dot inversion.

7. The integrated display system circuitry as claimed in claim 1, wherein the lower display frame rate ranges from about 60 Hz and a higher touch sensing rate ranges is about 120 Hz for the dual gate display panel.

8. The integrated display system circuitry as claimed in claim 1, wherein the Low-temperature polycrystalline silicon (LTPS) display panel further comprises a plurality of display phases and wherein touch sensing is operably configured within each display phase of the plurality of display phases of a display frame.

9. A method for an integrated display system circuitry capable of saving power consumption, the method comprising steps of:
   identifying a number of multiplex (n) of a display panel;
   resetting a phase counter (k) value to 1;
   setting a multiplexer of the display panel with the phase counter (k) value;
   driving the display panel;
   scanning a touch sensor;
   completing the phase counter (k) value and increasing the phase counter by 1;
   evaluating whether the phase counter (k) value is greater than the number of multiplex (n);
   resetting the phase counter when the phase counter (k) value is greater than the number of multiplex (n); and
   continuing the method when the phase counter (k) value is not greater than the number of multiplex (n);
   wherein the display panel is selected from a dual gate display panel with at least two multiplexers and a Low-temperature polycrystalline silicon (LTPS) display panel with 3 multiplexers, 6 multiplexers or n-multiplexers.

10. The method as claimed in claim 9, wherein the method further comprises selecting a sequence for a phase 1 and a phase 2 and selecting a gate scan direction and the gate scan direction is selected from a forward display direction and a backward display direction.

11. The method as claimed in claim 10, wherein the method further comprises a touch sensing between the phase 1 and the phase 2.

12. The method as claimed in claim 11, wherein the phase 1 and the phase 2 have a forward display direction and a backward display direction.

13. The method as claimed in claim 12, wherein the phase 1 and the phase 2 are arranged in a column inversion and an n-dot inversion.

14. The method as claimed in claim 9, wherein the method further comprises a lower display frame rate of about 60 Hz and a higher touch sensing rate of about 120 Hz for the dual gate display panel.

15. The method as claimed in claim 9, wherein a touch sensing rate of the Low-temperature polycrystalline silicon (LTPS) display panel with n-multiplexers is n times a display frame rate.

16. The method as claimed in claim 9, wherein a gate sequence of a gate electrode is configured to swap a sequence of the phase 1 with a sequence of the phase 2.

17. The method as claimed in claim 9, wherein the method further comprises a lower display frame rate and a higher touch sensing rate for the display panel.

* * * * *